(12) United States Patent
Mulder

(10) Patent No.: US 7,156,385 B2
(45) Date of Patent: Jan. 2, 2007

(54) LINEARLY ADJUSTABLE APPARATUS FOR LOCATING A WORKPIECE

(75) Inventor: Douglas A. Mulder, Clinton Township, MI (US)

(73) Assignee: Norgren Automotive, Inc., Clinton Township, MI (US)

( * ) Notice: Subject to any disclaimer, the term of this patent is extended or adjusted under 35 U.S.C. 154(b) by 194 days.

(21) Appl. No.: 10/858,630

(22) Filed: Jun. 2, 2004

(65) Prior Publication Data

US 2005/0006834 A1 Jan. 13, 2005

Related U.S. Application Data

(60) Provisional application No. 60/475,095, filed on Jun. 3, 2003.

(51) Int. Cl.
*B23Q 3/08* (2006.01)

(52) U.S. Cl. .......................................... 269/32; 269/24

(58) Field of Classification Search .................. 269/32, 269/228, 24–27, 20, 49, 233
See application file for complete search history.

(56) References Cited

U.S. PATENT DOCUMENTS

| 2,538,812 | A |  | 1/1951 | Umberger |
|---|---|---|---|---|
| 3,815,480 | A |  | 6/1974 | Spyra |
| 4,088,064 | A |  | 5/1978 | Tsunemoto et al. |
| 4,699,044 | A |  | 10/1987 | Riggs |
| 6,199,846 | B1 | * | 3/2001 | Crorey .......................... 269/32 |
| 6,220,588 | B1 | * | 4/2001 | Tunkers ....................... 269/32 |
| 6,298,572 | B1 |  | 10/2001 | McAuley ...................... 33/573 |
| 6,439,560 | B1 | * | 8/2002 | Sawada et al. ................ 269/32 |
| 6,470,787 | B1 |  | 10/2002 | Hirano ........................ 92/13.6 |
| 2005/0006834 | A1 | * | 1/2005 | Mulder ........................ 269/320 |
| 2005/0230893 | A1 | * | 10/2005 | Zajac et al. ................... 269/32 |

FOREIGN PATENT DOCUMENTS

| DE | 100 49 992 A1 | 10/2000 |
|---|---|---|
| DE | 100 49 992 A1 | 5/2002 |

* cited by examiner

*Primary Examiner*—Lee D. Wilson
(74) *Attorney, Agent, or Firm*—Young Basile

(57) ABSTRACT

A linearly adjustable apparatus having a stroke adjustment for locating geometric references on a workpiece. The present invention provides a housing having a linear actuator for actuating a locating member between an extended position, wherein the locating member engages the workpiece, and a retracted position, wherein the locating member disengages the workpiece. A bearing assembly is connected to the housing and slidably supports the locating member. The bearing assembly has an external threaded portion that threadably engages an internal threaded portion of the housing to provide linear adjustment of the stroke length of the locating member along a longitudinal axis of the housing. A jam nut threadably engages the bearing assembly to secure the relative position of the bearing assembly relative to the housing.

19 Claims, 4 Drawing Sheets

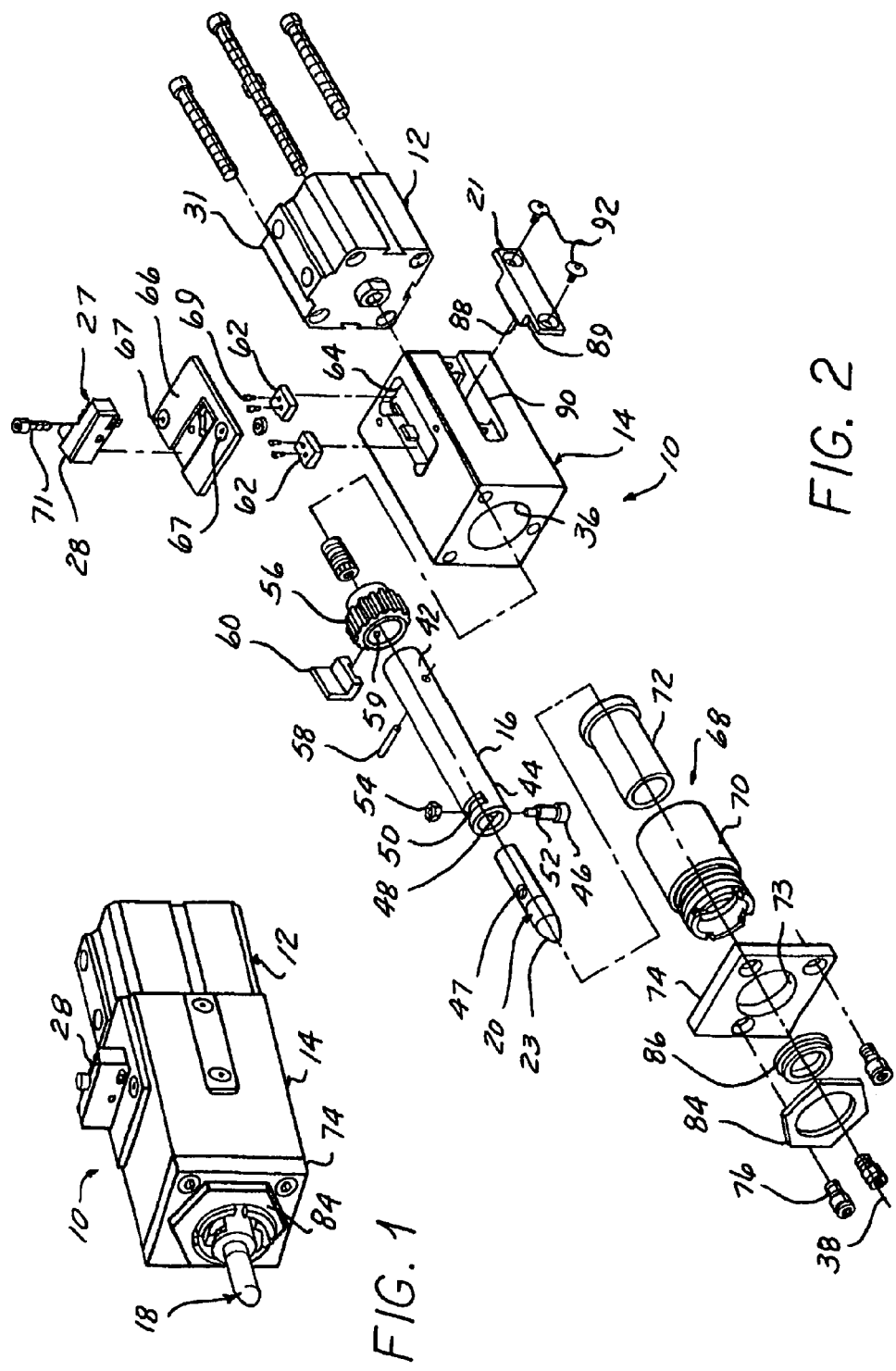

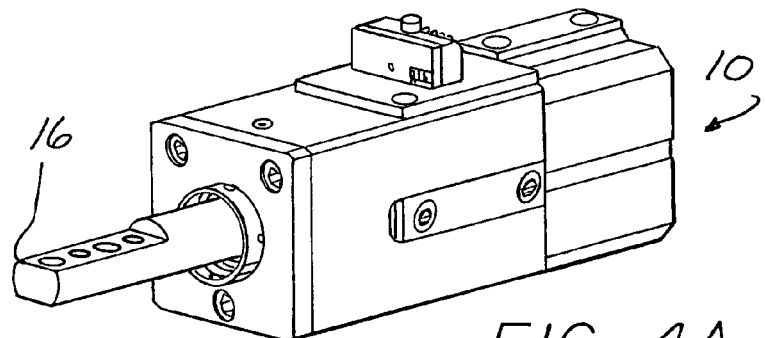
FIG. 4A
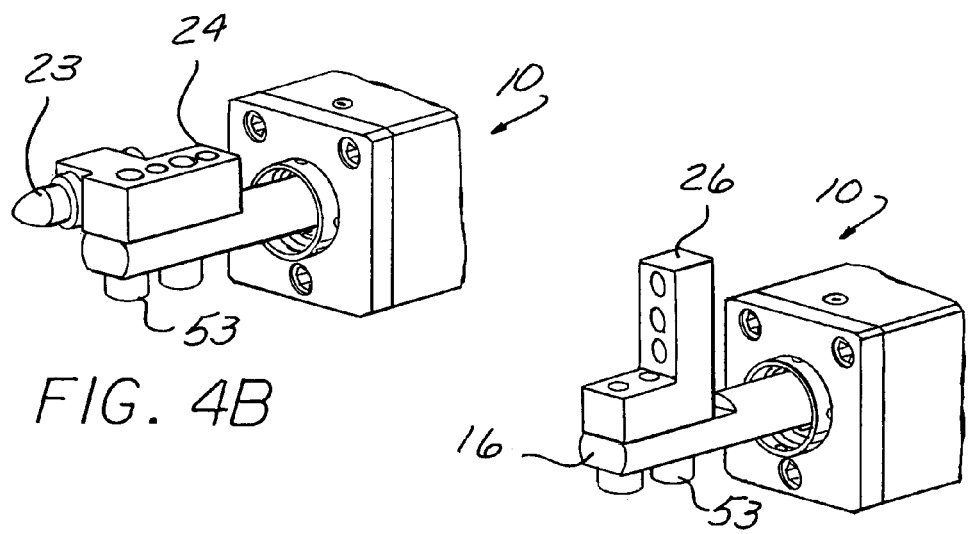
FIG. 4B
FIG. 4C
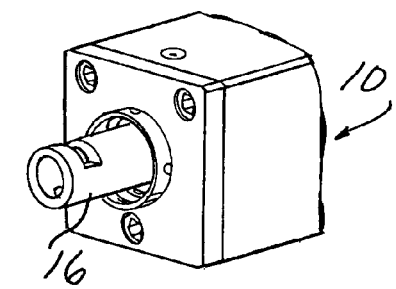
FIG. 4D
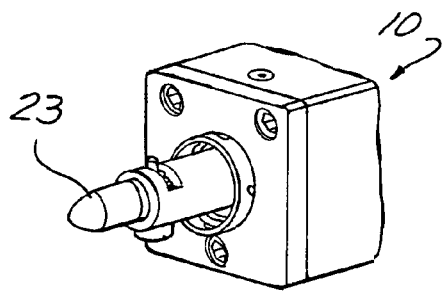
FIG. 4E

LINEARLY ADJUSTABLE APPARATUS FOR LOCATING A WORKPIECE

This application claims the benefit of U.S. Provisional Application No. 60/475,095, filed Jun. 3, 2003.

FIELD OF THE INVENTION

The present invention relates to an apparatus for locating a workpiece, and more particularly, a locating device that provides linear stroke adjustment of a locating member to properly locate a geometric reference on a workpiece.

BACKGROUND OF THE INVENTION

It is well known within the manufacturing industry to locate various geometric references on a workpiece, such as sheet metal parts and other stampings, by actuating a locating member between an extended position, wherein the locating member engages a workpiece, and a retracted position, wherein the locating member disengages the workpiece. Various types of locating members may be utilized depending on the geometric reference to be located. For instance, location holes provided in sheet metal parts may be located by locating pins. Retractable locating pins have been developed to automatically move in and out of apertures provided in sheet metal parts. Although locating pins are ideally suited for locating apertures within sheet metal parts, L-blocks may be utilized to locate a surface or an edge of a workpiece. This is done by attaching the L-block to the locating pin or an output shaft by which the locating pin is connected thereto.

Adjustment of the locating members can be rather cumbersome. Fine adjustment of the locating pin is typically not required since the locating pin must simply be long enough to extend through the location holes in the sheet metal workpiece. However, L-blocks do require fine adjustment, as L-blocks are typically utilized to abut a surface or an edge of the sheet metal workpiece. In order to provide fine adjustment to the L-block, shims are typically inserted between the L-block and the locating pin in order to properly locate the L-block with respect to the sheet metal workpiece. Unfortunately, shims are an inefficient method of providing fine adjustment to the L-block, as they are typically inaccurate and clumsy to use.

It would be desirable to provide a linear stroke adjustment to a locating device that was quick, simple, and accurate.

SUMMARY OF THE INVENTION

The present invention relates to a linearly adjustable apparatus for locating geometric references on a workpiece. The present invention provides a housing having a longitudinal axis and a linear actuator connected thereto. A locating member is at least partially disposed within the housing and is actuated by the linear actuator for movement along the longitudinal axis between an extended position, wherein the locating member engages the workpiece, and a retracted position, wherein the locating member disengages the workpiece. A bearing is connected to the housing and slidably supports the locating member between the extended position and the retracted position. The bearing cooperatively engages and positively stops the locating member in the extended position. The bearing has a threaded portion that engages a threaded portion on the housing for moving the bearing in and out of the housing and linearly adjusting the stroke length of the locating member. A jam nut may threadably engage the threaded portion of the bearing for securing the position of the bearing relative to the housing. In an alternative embodiment, a set screw may be threadably inserted into a threaded aperture of the housing for engaging the bearing and prohibiting the movement of the bearing relative to the housing.

BRIEF DESCRIPTION OF THE DRAWINGS

The description herein makes reference to the accompanying drawings wherein like referenced numerals refer to like parts throughout several views and wherein:

FIG. 1 is a perspective view of the linearly adjustable apparatus of the present invention.

FIG. 2 is an exploded view showing the linearly adjustable apparatus of the present invention.

FIGS. 4A–4E are perspective views of the linearly adjustable apparatus of the present invention utilizing various locating members.

DESCRIPTION OF THE PREFERRED EMBODIMENT

Figure 3:
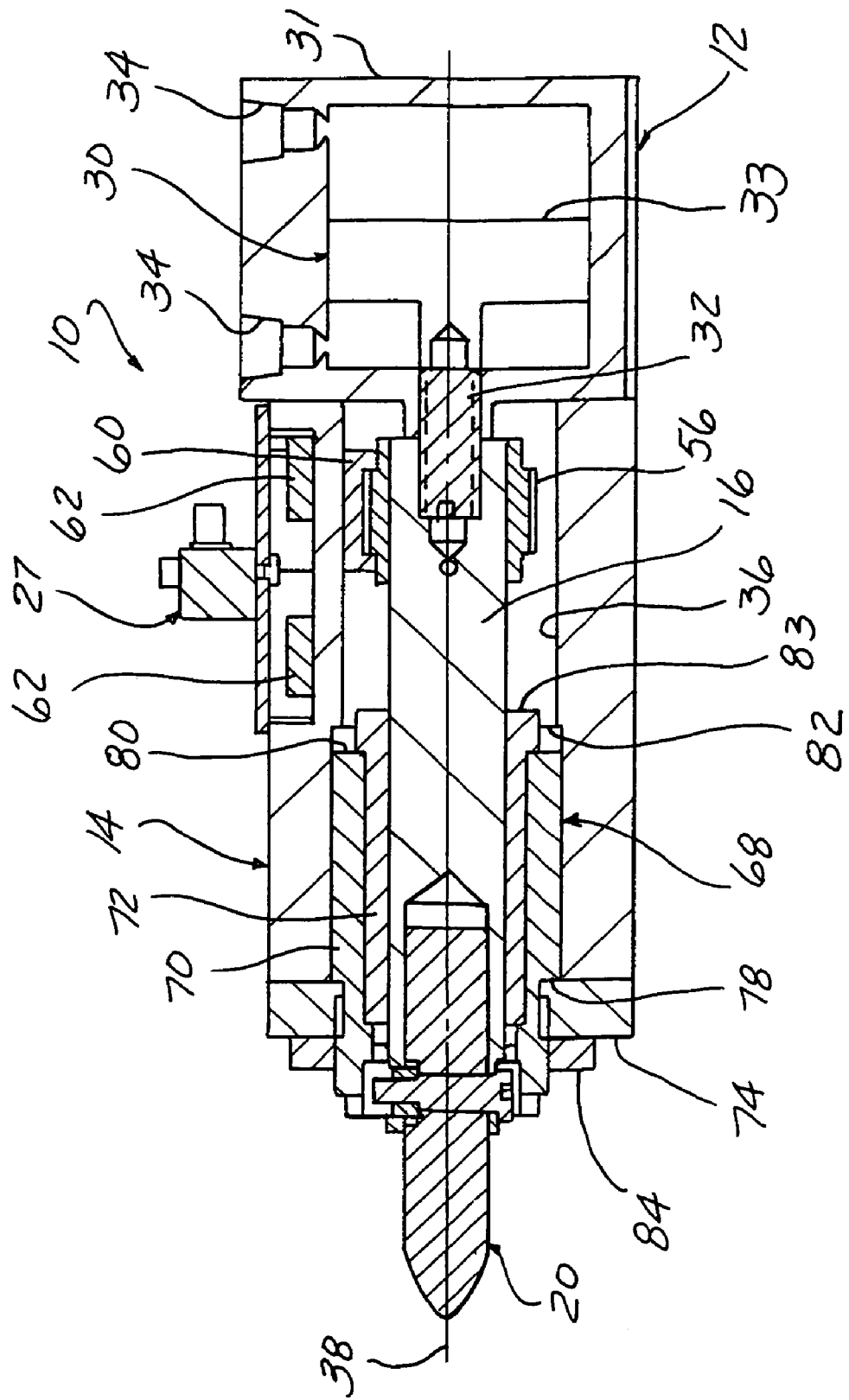
FIG. 3 is a sectional view showing the linearly adjustable apparatus of the present invention.

Referring to the drawings, the present invention will now be described in detail with reference to the disclosed embodiment.

FIGS. 1–4 illustrate a linearly adjustable apparatus 10 having a linear stroke adjustment for locating various geometric references on a workpiece (not shown), such as apertures, surfaces, and edges of the workpiece. The apparatus 10 of the present invention includes a linear actuator 12 connected to a body or a housing 14. The housing 14 slidably supports a locating member 18 for movement between a retracted position, wherein the locating member 18 does not engage the workpiece, and an extended position, wherein the locating member extends outward from the housing 14 of the apparatus 10. At least a portion of the locating member 18 remains slidably disposed within the housing 14 in both the extended position and the retracted position. The locating member 18 includes an output shaft 16 that is connected to the linear actuator 12 at a first end 42 of the output shaft 16, and a locating pin 20 that is connected to an opposite or second end 44 of the output shaft 16. The locating pin 20 may comprise various structures, such as a substantially cylindrical member 23, an L-block mounting ram with an offset pin 24, and an L-block mounting ram with an L-block 26. A striker 21 is releasably connected to the housing 14 and adjustably engages and maintains the locating member 18 in a predetermined angular position. The apparatus 10 of the present invention may also provide a sensing device 27 connected to and extending from the housing 14 of the apparatus 10 to allow for electronic monitoring of the position of the locating member 18.

To reciprocally actuate the locating member 18 between the extended position and the retracted position, the linear actuator 12 is connected to the housing 14 and is pneumatically actuated. As seen in FIGS. 1–3, the linear actuator 12 houses a piston 30 that is slidably disposed within a housing 31 of the linear actuator 12. The piston 30 includes a piston rod 32 connected to a piston head 33 wherein the piston rod 32 extends outwardly from the housing 31 of the linear actuator 12 and into the housing 14 of the apparatus 10. A pair of passageways 34 are formed in the housing 31 of the linear actuator 12 to communicate pressurized air from a pressurized air source (not shown) to both sides of the piston head 33. The introduction of pressurized air onto either side of the piston head 33, while exhausting air from the opposite side of the piston head 33, allows for reciprocal movement of the piston 30 between the extended position and the retracted position. Although the linear actuator 12 is ideally suited for pneumatic actuation, the linear actuator 12 may also utilize other forms of fluid actuation, such as hydraulics.

The housing 14 of the apparatus 10 of the present invention has a substantially rectangular structure having a substantially cylindrical throughbore 36 extending along a longitudinal axis 38 of the housing 14. The output shaft 16 of the locating member 18 is slidably disposed within the bore 36 of the housing 14. The first end 42 of the output shaft 16 is connected to the piston rod 32 of the linear actuator 12, and the second or opposite end 44 of the output shaft 16 extends toward the open end of the housing 14. The second end 44 of the output shaft 16 may be connected to the locating pin 20 which may extend outward from the housing 14. The locating pin 20 may be connected to the output shaft 16 through various attachment means. When utilizing the cylindrical member 23 as the locating pin 20, the cylindrical member 23 may be connected to the output shaft 16 through the use of a threaded fastener 46. The cylindrical member 23 provides an aperture 47 extending therethrough which correspondingly aligns with an aperture 48 and a slot 50 provided in the second end 44 of the output shaft 16. Fastener 46 provides a threaded screw portion 52 which extends through the aperture 48 and slot 50 of the output shaft 16, as well as the aperture 47 in the cylindrical member 23. A threaded nut 54 threadably engages and secures the screw portion 52 of fastener 46 to the output shaft 16. When the various L-block mounting arrangements 24, 26 are utilized as the locating pin 20, threaded fasteners 53 may be utilized to secure the L-blocks 24, 26 to a different structural configuration of the end of the output shaft 16.

To sense the position of the locating member 18, a splined cylinder 56 is connected to and overlies the first end 42 of the output shaft 16 in a substantially coaxial manner, as seen in FIGS. 2–3. The splined cylinder 56 is connected to the output shaft 16 through the use of a pin 58 which extends through corresponding apertures 59 in the splined cylinder 56 and the output shaft 16. A substantially L-shaped tracking block 60 longitudinally engages the splined cylinder 56 by extending over the ends of splined cylinder 56. However, the tracking block 60 does not engage the splines of the splined cylinder 56. This allows the tracking block 60 to travel with the output shaft 16 along the longitudinal axis 38 of the housing 14 when moving between the extended position and the retracted position. A pair of proximity sensors 62 are mounted in a recess 64 provided in the housing 14 for sensing the position of the tracking block 60. The recess 64 and the proximity sensors 62 are covered by a plate 66 which is secured to the housing 14 of the apparatus 10 by fasteners 67. The electronic terminal 28 is secured to the cover plate 66 of the housing 14 and extends through an aperture provided in the cover plate 66 of the housing 14. The electronic terminal 28 is electronically coupled to the proximity sensors 62 to provide an electronic signal to a controller (not shown) which interprets the signal from the electronic terminal 28 to indicate the position of the locating member 18.

In order to slidably support the locating member 18 within the housing 14 of the apparatus 10, a bearing assembly 68 is provided within the bore 36 of the housing 14. The bearing assembly 68 provides an outer, substantially cylindrical portion 70 that is press-fit to an inner, substantially cylindrical portion 72. The inner portion 72 slidably receives and supports the output shaft 16 along the inner diameter of the inner portion 72. The outer portion 70 of the bearing assembly 68 provides an external threaded portion which threadably engages a threaded aperture 73 provided in an end block 74. The end block 74 is substantially rectangular and is connected to the open end of the housing 14 by three threaded fasteners 76. The outer portion 70 of the bearing assembly 68 may be threaded in and out of the threaded aperture of the end block 74 along the longitudinal axis 38 of the housing 14 to adjust the length of the stroke of the locating member 18. The stroke adjustment is limited by a pair of shoulders 78, 80 provided on the outer diameter of the outer portion 70 of the bearing assembly 68. The first shoulder 78 engages an inner surface of the end block 74 to limit the outward adjustment of the bearing assembly 68 toward the extended position. The second shoulder 80 of the outer portion 70 may engage a shoulder 82 formed in the internal wall of the housing 14 that defines the bore 36 to limit the stroke adjustment of the bearing assembly 68 toward the retracted position. In another embodiment, the bore 36 of the housing 14 has a constant diameter (not shown), and thus, shoulder 82 does not exist. This allows further stroke adjustment toward the retracted position since the bearing assembly 68 is not prevented from being further threaded into the housing 14. In both embodiments, a substantially hexagonal jam nut 84 has a threaded aperture that is threaded to the threaded portion of the outer portion 70 of the bearing assembly 68 adjacent the end block 74 to secure the bearing assembly 68 in a fixed position. A seal 86 is provided between the output shaft 16 and the inner diameter of the outer portion 70 of the bearing assembly 68 to prevent any contamination from entering the apparatus 10.

Figure 5A:
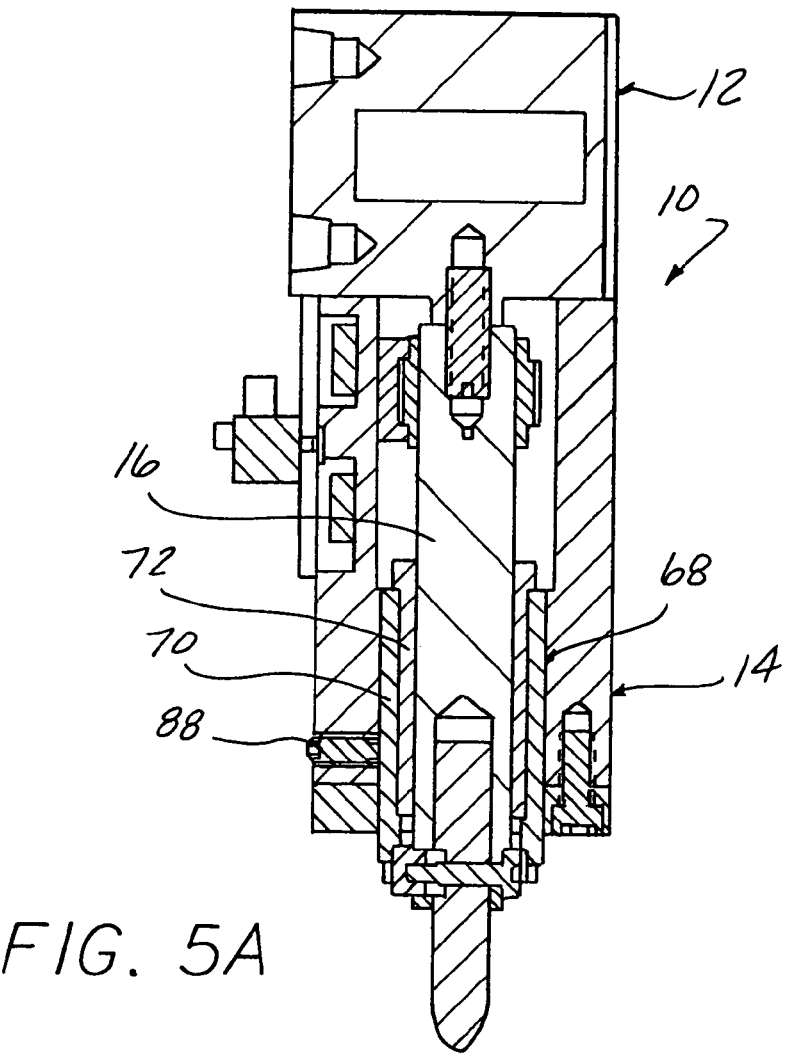
FIG. 5A is a sectional view showing an alternate embodiment of the linearly adjustable apparatus of the present invention.
Figure 5B:
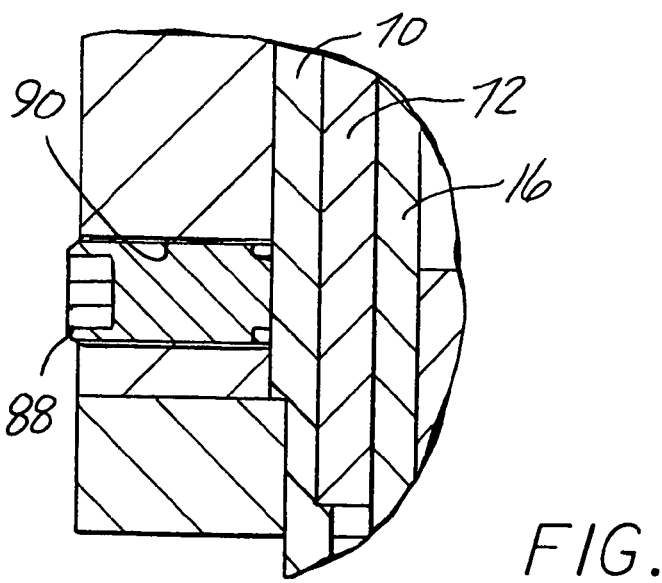
FIG. 5B is an exploded sectional view of FIG. 5A.

In an alternative embodiment of the apparatus 10, a set screw 88 may be utilized to secure the bearing assembly 68 in a fixed position, as seen in FIG. 5, as opposed to the jam nut 84 displayed in FIGS. 1–4. The set screw 88 is threaded into a threaded aperture 90 that extends from the outer wall of the housing 14 to the outer portion 70 of the bearing assembly 68. When tightened, the set screw 88 engages the outer portion 70 of the bearing assembly 68 to prevent movement of the bearing assembly 68 relative to the housing 14.

In operation, an appropriate locating pin 20 is connected to the output shaft 16 to form the locating member 18 of the apparatus 10. The geometric reference to be located on the workpiece is identified, and the appropriate stroke distance of the locating member 18 is determined. The jam nut 84 is threadably loosened, and the outer portion 70 of the bearing assembly 68 is threaded in and out of the threaded aperture in the end block 74 along the longitudinal axis of the housing 14 until the appropriate stroke adjustment is provided. The jam nut 84 is then threaded back on to the outer portion 70 of the bearing assembly 68 to secure the position of the bearing assembly 68 relative to the housing 14 of the apparatus 10. The locating member 18 may then be properly actuated between the extended position and the retracted position. When the locating member 18 is actuated toward the extended position, an edge of the splined cylinder 56 on the locating member 18 abuts a shoulder on the end of the inner portion 72 of the bearing assembly 68. Since the inner portion 72 of the bearing assembly 68 is fixed to the housing 14, the locating member 18 is positively stopped in the extended position. Thus, by moving the bearing assembly 68 axially along the longitudinal axis of the housing 14, the stroke length of the locating member 18 may be linearly adjusted. When the locating member 18 is actuated toward the retracted position, the piston head 33 abuts the housing 31 of the linear actuator 12 thereby positively stopping the locating member 18 in the retracted position. In the alternative embodiment, the set screw 88 may be utilized to secure the position of the bearing assembly 68 as opposed to the jam nut 84.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A linearly adjustable apparatus for locating a workpiece, comprising:
    a housing having a longitudinal axis;
    a locating member at least partially disposed within said housing for movement along said longitudinal axis between an extended position, wherein said locating member is engageable with said workpiece, and a retracted position, wherein said locating member is not engageable with said workpiece;
    a bearing threadably connected to said housing for slidably supporting said locating member between said extended position and said retracted position wherein said bearing member does not move relative to said housing during movement of said locating member between said extended position and said retracted position; and
    said bearing threadably adjustable to said housing for linearly adjusting the stroke of said locating member between said extended position and said retracted position.

2. The linearly adjustable apparatus stated in claim 1, further comprising:
    a linear actuator connected to said housing and coupled to said locating member for actuating said locating member between said extended position and said retracted position.

3. The linearly adjustable apparatus stated in claim 1, further comprising:
    said bearing cooperatively engaging and stopping said locating member in said extended position.

4. The linearly adjustable apparatus stated in claim 3, further comprising:
    a connector coupled to said bearing and said housing to prevent relative movement between said bearing and said housing.

5. The linearly adjustable apparatus stated in claim 4, wherein said connector further comprises:
    a jam nut releasably connected to said bearing and said housing.

6. The linearly adjustable apparatus stated in claim 4, wherein said connector further comprises:
    a set screw extending through a threaded aperture in said housing and engaging said bearing to prevent movement of said bearing relative to said housing.

7. A linearly adjustable apparatus for locating a workpiece, comprising:
    a housing having a longitudinal axis and a linear actuator connected thereto;
    a locating member at least partially disposed within said housing for actuation by said linear actuator along said longitudinal axis between an extended position, wherein said locating member is engageable with said workpiece, and a retracted position, wherein said locating member is not engageable with said workpiece;
    a bearing threadably connected to said housing for slidably supporting said locating member between said extended position and said retracted position wherein said bearing member does not move relative to said housing when said locating member moves between said extended position and said retracted position, and said bearing positively stopping said locating member in said extended position; and
    said bearing threadably adjustable along said longitudinal axis of said housing for adjusting the stroke length of said locating member between said extended position and said retracted position.

8. The linearly adjustable apparatus stated in claim 7, further comprising:
    said bearing having a threaded portion threadingly engaging a threaded portion of said housing wherein the threading of said bearing in and out of said housing provides linear adjustment of the stroke length of said locating member along said longitudinal axis of said housing.

9. The linearly adjustable apparatus stated in claim 8, further comprising:
    a jam nut releasably engaging said threaded portion of said bearing and said housing to prevent relative movement between said bearing and said housing.

10. The linearly adjustable apparatus stated in claim 8, further comprising:
    a set screw extending through a threaded aperture in said housing and engaging said bearing to prevent relative movement between said bearing and said housing.

11. The linearly adjustable apparatus stated in claim 8, wherein said bearing further comprises:
    an inner, substantially cylindrical portion for slidably receiving said locating member; and
    an outer, substantially cylindrical portion connected to said inner portion and having said threaded portion of said bearing formed thereon.

12. The linearly adjustable apparatus stated in claim 7, further comprising:
    said locating member having a shoulder; and
    said bearing having a shoulder for engaging said shoulder of said locating member for positively stopping said locating member in said extended position.

13. A linearly adjustable apparatus for locating a workpiece, comprising:
    a housing having a longitudinal axis and a linear actuator connected thereto;
    a locating member at least partially disposed within said housing for actuation by said linear actuator along said longitudinal axis of said housing between an extended position, wherein said locating member is engageable with said workpiece, and a retracted position, wherein said locating member is not engageable with said workpiece;
    a bearing disposed within said housing for slidably supporting said locating member between said extended position and said retracted position and positively stopping said locating member in said extended position; and said bearing having an external threaded portion for threadingly engaging an internal threaded portion of said housing wherein the threading of said bearing into and out of said housing provides linear adjustment of the stroke of said locating member along said longitudinal axis of said housing.

14. The linearly adjustable apparatus stated in claim 13, further comprising:

a jam nut threadingly engaging said external threaded portion of said bearing and engaging said housing to prevent relative movement between said bearing and said housing.

15. The linearly adjustable apparatus stated in claim 13, further comprising:

a set screw extending through a threaded aperture of said housing and engaging said bearing to prevent the relative movement between said bearing and said housing.

16. The linearly adjustable apparatus stated in claim 13, wherein said bearing further comprises:

an inner, substantially cylindrical portion for slidably receiving said locating member; and an outer, substantially cylindrical portion connected to said inner portion and having said external threaded portion of said bearing formed thereon.

17. The linearly adjustable apparatus stated in claim 16, further comprising:

said locating member having a shoulder; and said outer portion of said bearing having a shoulder for engaging said shoulder of said locating member and positively stopping said locating member in said extended position.

18. The linearly adjustable apparatus stated in claim 17, further comprising:

said shoulder on said locating member fabricated from a splined cylinder overlying and connected to said locating member in a substantially coaxial fashion.

19. The linearly adjustable apparatus stated in claim 13, further comprising:

said internal threaded portion of said housing fabricated from an end block having a threaded aperture extending therethrough wherein said end block is connected to said housing.

* * * * *